Feb. 18, 1936. J. K. KAHN 2,031,319
BELT DRIVE
Filed May 3, 1935
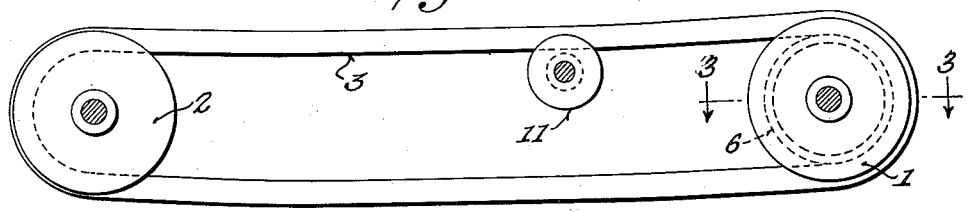
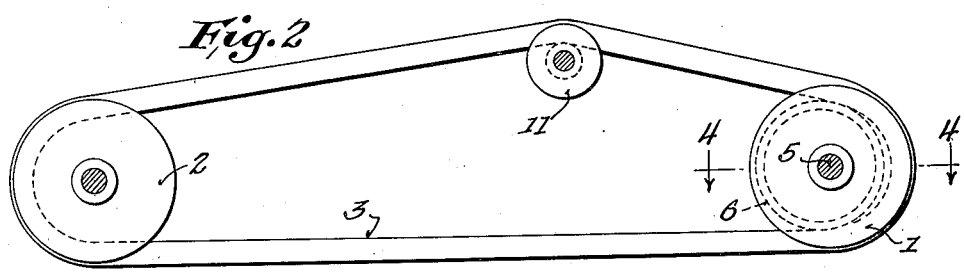
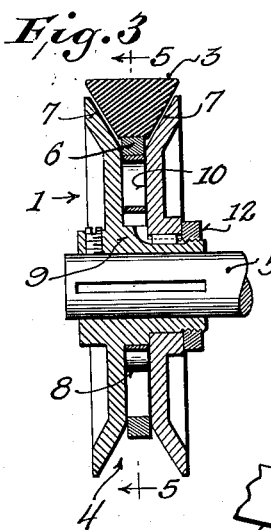
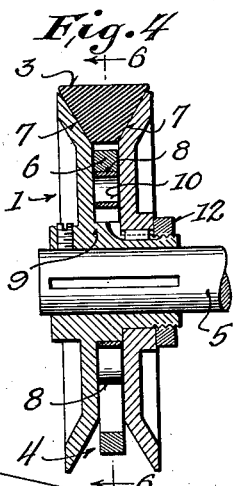
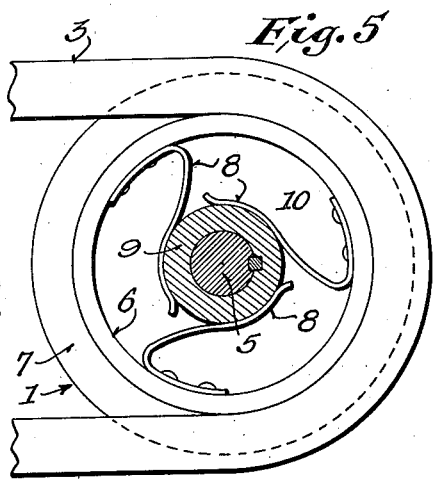
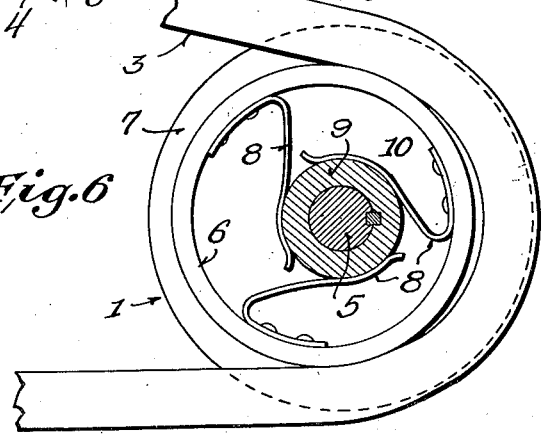
INVENTOR.
J. KESNER KAHN
BY Bottum, Hudnall, Lecher,
McNamara & Michael
ATTORNEY.

Patented Feb. 18, 1936

2,031,319

UNITED STATES PATENT OFFICE 2,031,319

BELT DRIVE

Jacob Kesner Kahn, Chicago, Ill.

Application May 3, 1935, Serial No. 19,543

6 Claims. (Cl. 74—230.5)

This invention relates to a belt drive and more particularly to a drive for V-belts.

The general purpose and object of my invention is to provide one of the pulleys, preferably the driving pulley, with means acting automatically in response to tensioning and slackening the belt as by the use of a belt tightener, to shift the belt into and out of engagement with the side walls of the pulley groove to selectively release the belt from the drive of the pulley as may be required in the use of the drive.

In carrying out the objects of my invention, I provide the pulley in its groove with a member forming in effect the bottom of the groove and which member is shiftable into and out of concentric relation to the axis of the pulley to dispose the belt in and out of engagement with the side walls of the pulley groove in clutching the belt to and declutching it from the pulley.

A further object of my invention is to provide this member in the form of a ring slightly larger in diameter than the bottom of the groove and yieldably mounted in the pulley, whereby the ring when concentric with the axis of the pulley will support the belt out of contact with the side walls of the groove to release the belt from the drive of the pulley, and when eccentric to the pulley will allow the belt to engage the side walls of the groove to connect the belt to the drive of the pulley.

A further object of my invention is to provide the yieldable mounting for the ring of a character that the ring will be automatically shifted and supported in concentric relation with the axis of the pulley on slackening of the belt, whereas it will be shifted into eccentric relation to said axis on tightening or tensioning the belt.

The invention consists further in the features hereinafter described and claimed.

In the accompanying drawing:

Figs. 1 and 2 show a V-belt drive of my invention; Fig. 1 showing the belt slacked and released from the drive of the driving pulley, while Fig. 2 shows the belt tensioned and engaged with the driving pulley to rotate the driven pulley;

Fig. 3 is a sectional view taken on line 3—3 of Fig. 1, showing the belt displaced out of engagement with the side walls of the groove of the driving pulley;

Fig. 4 is a similar sectional view taken on line 4—4 of Fig. 2, showing the belt seated in the groove of said pulley and engaging the side walls thereof;

Fig. 5 is a sectional view taken on line 5—5 of Fig. 3 to show the belt shifting ring in concentric relation with the axis of the driving pulley; and Fig. 6 is a similar sectional view taken on line 6—6 of Fig. 4 to show the ring in eccentric relation to the axis of said pulley.

In Figs. 1 and 2, the driving and the driven pulleys are marked 1 and 2, respectively, while the belt which connects the pulleys is marked 3. The pulleys are fixed to their respective shafts whereby the power to be transmitted between the pulleys by the belt may be applied to the driving pulley 1 and be taken off from the driven pulley 2.

The belt 3, as shown in Figs. 3 and 4, is substantially V-shape in cross section and the pulleys 1 and 2 have peripheral grooves of similar shape to accommodate the belt. The groove in the driving pulley is marked 4 and the shaft to which this pulley is keyed or otherwise fixedly secured is marked 5.

Located in the pulley 1 in the plane of the groove 4 is a ring 6 having an outside diameter slightly greater than the bottom of the groove, whereby the ring when concentric to the axis of the pulley will extend beyond the bottom of the groove and support the belt out of contact with the side walls 7, 7 of the groove, as shown in Fig. 3. The ring 6 is shifted to and supported in this position, when the belt is slack, by the yieldable mounting provided in the pulley for the ring. This mounting, in the form shown in the drawing, comprises a plurality of spring members 8, 8, secured to the inner side of the ring and bearing against the body portion 9 of the pulley about its shaft 5. The portion 9 is spaced radially inward from the groove 4 by an annular chamber or recess 10 which accommodates the ring 6 and its mounting and permits shifting of the ring into and out of concentric relation to the axis of the pulley.

The recess 10 is substantially as wide as the bottom of the groove 4 and opens into it, whereby the belt 3 may engage the ring 6 in all positions of said ring with respect to the axis of the pulley 1. The ring 6 is guided in its shifting movements by contact with the sides of the recess 10, as shown. The ring need be no wider than the bottom of the groove 4 and thus may be made relatively thin. The ring is revolubly mounted in the recess 10 and is held against rotation by the belt 3 when holding the belt out of contact with the side walls 7 of the groove 4. Thus, the pulley 1 may "slip" or rotate with respect to the belt, and no power will be transmitted to the pulley 2. The belt is slacked at this time by moving the idler pulley 11 into the position shown in Fig. 1.

The spring members 8 may be in the form of spring strips circumferentially spaced about the ring 6 and secured at one end to the ring and bearing at the other end against the pulley portion 9 as shown in Figs. 5 and 6. The yieldable mounting for the ring 6, regardless of the particular structure employed, normally tends to shift and support the ring into concentricity with the rotary axis of the pulley 1.

To establish driving connection between the belt and the driving pulley 1, the idler 11 is moved to tension or tighten the belt 3 as shown in Fig. 2. This shifts the ring 6 into eccentric relation to the axis of the pulley 1 and seats the belt in the groove 4 of the pulley, as shown in Figs. 4 and 6. The portion of the ring engaged by the belt is forced into the chamber 10 until the belt engages the side walls 7 of the groove whereupon the rotating pulley 1 drives the belt and rotates the pulley 2. The yieldable mounting 8 for the ring 6 responds to this pressure and allows the ring to shift to engage the belt with the rotating pulley 1.

To release the belt from the drive of the pulley 1, the belt is slackened, and the ring by its mounting shifts to lift the belt out of engagement with the side walls of the groove 4. This shifting of the ring with respect to the axis of the pulley is automatic in response to slackening and tensioning the belt.

The belt drive shown and described is not only simple in construction and effective in operation, but enables a V-belt to be readily and easily shifted into and out of tractive engagement with its driving pulley. The action is automatic, the force applied being controlled through the tensioning of the belt itself. This is important in that the only manually operable part is that constituting the idler 11 or equivalent means for slackening and tightening the belt. The pulley 1, will of course be so constructed that the ring 6 and its yieldable mounting may be assembled in the recess 10 and be reached for inspection and repair. In keeping with this thought, the pulley may be made in sections, each including one of the side walls of the pulley groove and keyed together at the hub portion 9, as shown in Figs. 3 and 4. A ring nut 12 may be screwed on the hub portion to secure the sections in pulley forming relation.

The ring 6 by reason of its contact with the inner face of the belt 3 will be rotated with the pulley when the ring is in eccentric relation to the axis of the pulley and thus will not slip with respect to the belt to wear it as the pulley drives the belt. On the other hand, the ring does not wear the belt when the ring is concentric to the pulley axis as the belt holds the ring against rotation at such time.

The details of construction and arrangement of parts shown and described may be variously changed and modified without departing from the spirit and scope of my invention, except as pointed out in the appended claims.

In connection with the above it is pointed out that in place of a stiff circular ring 6 as shown, a flexible ring as of spring steel may be used. Such a ring would elongate in response to tensioning the belt and enable the belt to seat itself effectively in the groove of the pulley.

I claim as my invention:

1. In a belt drive of the character described comprising in combination, a V-belt, a pulley having a V-groove for the belt, means for tensioning the belt, and means incorporated in the pulley acting in response to tensioning and slackening the belt to shift the belt into and out of tractive engagement with the side walls of the pulley groove.

2. In a belt drive of the character described comprising in combination, a V-belt, a pulley having a V-groove for the belt, means for tensioning the belt, and means incorporated in the pulley and acting through the bottom of the groove in response to tensioning and slackening the belt to shift the belt into and out of tractive engagement with the side walls of the pulley groove.

3. In a belt drive of the character described comprising in combination, a V-belt, a pulley having a V-groove for the belt, means for tensioning the belt, and a ring supported by the pulley in the groove and engaged by the inner surface of the belt, said ring being shiftable into and out of concentric relation to the axis of rotation of the pulley in response to tensioning and slackening the belt to displace the belt out of and into tractive engagement with the side walls of the pulley groove.

4. In a belt drive of the character described comprising in combination, a V-belt, a pulley having a V-groove for the belt, means for tensioning the belt, a ring supported by the pulley in the groove and engaged by the inner surface of the belt, said ring having an outside diameter greater than the bottom of the groove, and means providing a resilient mounting for the ring in the pulley, whereby the ring in response to tensioning and slackening the belt may shift the belt into and out of tractive engagement with the side walls of the pulley groove.

5. In a belt drive of the character described comprising in combination, a V-belt, a pulley having a V-groove for the belt, means for tensioning the belt, said pulley having an annular chamber in the plane of and opening into the groove through the bottom of the same, a ring mounted in said chamber and having an outside diameter greater than the bottom of the groove and engaged by the inner surface of the belt, and resilient means disposed in said chamber and providing a yieldable mounting for the ring, whereby the ring in response to tensioning and slackening the belt will be moved into and out of concentric relation with the axis of rotation of the pulley to shift the belt out of and into tractive engagement with the side walls of the pulley groove.

6. A pulley of the character described, comprising a V-groove for a V-belt, an annular chamber in the plane of the groove and opening into the bottom of the groove, a ring revolubly mounted in said chamber and having an outside diameter greater than the bottom of the groove, and means providing a yieldable mounting for the ring in the chamber, said means cooperating with the ring and the pulley to normally hold the ring in concentric relation to the axis of the pulley.

J. KESNER KAHN.